United States Patent [19]

Matsuo et al.

[11] Patent Number: 4,663,427

[45] Date of Patent: May 5, 1987

[54] PROCESS FOR PREPARING POLYCYANOARYL ETHER POWDER

[75] Inventors: Shigeru Matsuo; Tomoyoshi Murakami, both of Sodegaura, Japan

[73] Assignee: Idemitsu Kosan Company Limited, Tokyo, Japan

[21] Appl. No.: 810,934

[22] Filed: Dec. 19, 1985

[30] Foreign Application Priority Data

Dec. 27, 1984 [JP] Japan ................. 59-274090

[51] Int. Cl.$^4$ ............................................. C08G 65/46
[52] U.S. Cl. ..................................... 528/211; 528/218; 528/219; 528/491; 528/493; 528/496; 528/499
[58] Field of Search ............... 528/210, 211, 218, 491, 528/493, 496, 499

[56] References Cited

U.S. PATENT DOCUMENTS

| | | | |
|---|---|---|---|
| 3,730,946 | 5/1973 | Heath et al. | 528/211 |
| 3,784,504 | 1/1974 | Feasey | 528/211 |
| 4,042,567 | 8/1977 | Sundermann | 528/211 |
| 4,108,837 | 8/1978 | Johnson et al. | 528/211 |
| 4,567,248 | 1/1986 | Blinne et al. | 528/211 |

*Primary Examiner*—Harold D. Anderson
*Attorney, Agent, or Firm*—Frishauf, Holtz, Goodman & Woodward

[57] ABSTRACT

A process for preparing a polycyanoaryl ether powder which comprises;

reacting at a temperature between 100° and 350° C. a dihalogenobenzonitrile with an alkali metal salt of at least one of hydroquinone and dihydroxydiphenyl in the presence of a solvent (i) selected from the group consisting of dimethyl sulfoxide, diethyl sulfoxide, sulfolane, N-methylpyrrolidone, N-methylacetoamide and N-methylformamide to form a reaction mixture containing a dissolved polycyanoaryl ether; and when the concentration of said dissolved polycyanoaryl ether in the reaction mixture is in the range of from 2 to 15% by weight, adding to said reaction mixture, a solvent (ii) which is miscible with said solvent (i) but which is not a solvent for said polycyanoaryl ether, said solvent (ii) being added in an amount of from 30 to 200% by volume based on the volume of said solvent (i) and said solvent (ii) being added at a temperature of from 10° to 100° C., whereby said polycyanoaryl ether precipitates from said reaction mixture to which said solvent (ii) has been added, as an extremely fine powder.

14 Claims, No Drawings

PROCESS FOR PREPARING POLYCYANOARYL ETHER POWDER

BACKGROUND OF THE INVENTION

This invention relates to a new process for preparing a polycyanoaryl ether powder. More particularly, it is concerned with a process for preparing a finely divided polymer powder sufficiently purified without any steps for grinding the resultant polymer.

A polycyanoaryl ether is an engineering plastic with superior heat resistance and has been widely used as a material for electric and electronic equipments or mechanical components.

There is disclosed in Japanese Unexamined Patent Publication No. 14270/1972 a process for preparing the polycyanoaryl ether by reacting dinitrobenzonitrile with 2,2-bis(4-hydroxyphenyl)propane. However, the polymer thus produced has a problem in that sufficient heat resistance could not always be provided. Further, in the above process, when hydroquinone or dihydroxydiphenyl is employed as a dihydric phenol, there could not be produced a polymer having a sufficiently high molecular weight.

In view of the above state of prior art, the inventors had already proposed a process for preparing a polycyanoaryl ether with a high molecular weight from a dihalogenobenzonitrile and dihydric phenols (see Japanese Unexamined Patent Publication Nos. 144328/1985 and 147439/1985, Japanese Patent Application No. 165655/1984). However, there was needed a mechanical grinding of the resulting polymer at the purification stage of the polymer and there remained much room for improvements. The prior processes consumed large amounts of energy during the grinding step and the relatively coarse particle size of the resultant powder lead to insufficient purification.

SUMMARY OF THE INVENTION

Accordingly, it is a primary object of this invention to provide a process for preparing a polycyanoaryl ether powder wherein a fine polycyanoaryl ether powder can be obtained directly after completion of the polymerization reaction and hence there is no need for any mechanical grinding step to purify the resulting polymer.

In accordance with this invention, there is provided a process for preparing a polycyanoaryl ether powder which comprises;

reacting a dihalogenobenzonitrile with an alkali metal salt of at least one of hydroquinone and dihydroxydiphenyl in the presence of a solvent (i) to effect polycondensation reaction; and adding to the resulting reaction mixture a solvent (ii) which does not dissolve the resulting polymer but has compatibility with the solvent (i) when the concentration of the product polymer dissolved in the reaction mixture reaches the range of from 2 to 15% by weight.

DESCRIPTION OF THE PREFERRED EMBODIMENTS

As the dihalogenobenzonitrile which may be employed as a starting material in the present process, there may be mentioned, for example, 2,4-dichlorobenzonitrile, 2,6-dichlorobenzonitrile, 2,4-difluorobenzonitrile, 2,6-difluorobenzonitrile and the like and, inter alia, 2,6-dichlorobenzonitrile is preferable.

On the other hand, as the alkali metal salt of at least one of hydroquinone and dihydroxydiphenyl which may be employed together with said dihalogenobenzonitrile, there may be preferably mentioned, for example, the sodium or potassium salts thereof.

The present process comprises, more specifically, the first step which is the polycondensation reaction of a dihalogenobenzonitrile with an alkali metal salt of at least one of hydroquinone and dihydroxydiphenyl (or biphenol) in the presence of a solvent (i) to produce a polymer and the second step addition of a solvent (ii) which does not dissolve the polymer after completion of the polycondensation reaction but has compatibility (i.e., miscibility) with the solvent (i) to separate out a fine powder. In particular, the above-mentioned second step is the important point of this invention.

The process of this invention will be more fully illustrated below in due order of steps.

The first step is the polycondensation reaction of a dihalogenobenzonitrile with an alkali metal salt of at least one hydroquinone and dihydroxydiphenyl in the presence of a solvent (i). The solvent (i) which may be employed in this step may be any of those commonly employed in this field and there may be mentioned, for example, dimethyl sulfoxide, diethyl sulfoxide sulfolane, N-methylpyrrolidone, N-methylacetamide, N-methylformamide and the like. Of these compounds, sulfolane or N-methylpyrrolidone is preferred.

In this step, there may be present in situ, for instance, at least one of hydroquinone and dihydroxydiphenyl and a hydroxide or carbonate of said alkali metal, instead of employing an alkali metal salt of at least one of hydroquinone and dihydroxydiphenyl at the start of the reaction.

The amount of the starting materials, namely, a dihalogenobenzonitrile and an alkali metal salt of at least one of hydroquinone and dihydroxydiphenyl may be selected and determined depending upon the polymerisation degree of the desired polymer, but both material may be preferably employed in approximately equimolar amounts. When both alkali metal salts of hydroquinone and dihydroxydiphenyl are employed in combination for the polymerization, it is preferred to use these salts in an amount of 20 mole % or less.

The reaction temperature is usually in the range of 100° to 350° C., preferably 150° to 280° C., and the reaction time is usually 0.1 to 3.0 hours, preferably 1 to 2 hours. The reaction may be carried out at an atmospheric pressure or a pressure slightly above atmospheric.

Also, a molecular weight modifier may be added in this step, if necessary. As the molecular weight modifier which may be employed, there may be mentioned, for example, a monohydric phenol, such as, p-tert-butylphenol and p-cumylphenol or a monohalogenobenzonitrile. The amount thereof to be used may be selected and determined depending upon the molecular weight of the desired polymer.

After completion of the polycondensation reaction, the resulting polymer is present in a dissolved state in the reaction mixture.

The second step is to add a solvent which does not dissolve the resulting polymer but has compatibility with the solvent (i) (hereinafter referred to as a solvent (ii)) into the resulting reaction mixture.

As the solvent (ii), there may be mentioned typically water, methanol, ethanol, propanol, butanol, acetone, methyl ethyl ketone, methyl isobutyl ketone, β- butyrolactone, tetrachloroethane and the like, and water or methanol is particularly preferred.

The solvent (ii) should be added at the time when a concentration of the polymer as produced in the reaction mixture reaches to 2 to 15% by weight. More specifically, the polymer as produced in the reaction mixture according to the above first step would begin to gradually separate out or precipitate out in the reaction mixture as the temperature would drop, while the concentration of the polymer dissolved in the reaction mixture would gradually become lower. The solvent (ii) should be added when the concentration reaches 2 to 15% by weight.

If the polymer concentration is less than 2% by weight, the resulting polymer becomes a bulk material so that it is extremely difficult to finely divide said polymer, while, if the concentration is more than 15% by weight, the resulting polymer could not be susceptible to pulverization. In a practical aspect, the concentration may be preferably 5 to 12% by weight.

An amount of the solvent (ii) to be added is usually in the range of 30 to 200% by volume based on the solvent (i), preferably 50 to 100% by volume. The temperature when added is usually 10° to 100° C., preferably 20° to 70° C.

According to this second step, the polymer can be obtained in the form of an extremely fine powder so that there is no need for any mechanical grinding step for purification and a satisfactory purification can be accomplished in the subsequent purification step.

This invention will be further illustrated by way of the following examples and comparative examples.

EXAMPLE 1

Into a polymerization vessel with an inner volume of 10 liters equipped with a distillation apparatus, a stirrer and an argon gas bubbling tube were placed 430 g of 2,6-dichlorobenzonitrile, 272.5 g of hydroquinone and 414.6 g of potassium carbonate, together with 5 liters of sulfolane and 2 liters of toluene as a solvent (i), and the resulting mixture was stirred while argon gas was bubbled to conduct the reaction at 120° C. for 2 hours, at 160° C. for 1.5 hours and then at 200° C. for 2.5 hours. Then, the reaction vessel was cooled up to 120° C. and, when a polymer concentration in the reaction mixture reached 3.6% by weight, 3 liters of water as a solvent (ii) were added to raise the temperature to 70° C. The, stirring was continued over a further one hour.

Thereafter, the resulting suspension of a polymer powder was purified by washing three times with 10 liters of water and then once with 10 liters of acetone to give 500 g of a powdery polycyanoaryl ether, the average particle size of which was 40 μm. The reduced viscosity of this polymer [ηsp/c] was 1.60 dl/g at 60° C. in a solution in which the resulting polymer is dissolved in p-chlorophenol in concentration of 0.2 g/dl. Moreover, the residual potassium in this polymer was measured according to the atomic absorption method for examining the purified state of the polymer to give a value of 140 ppm by weight. The volume resistivity of this polymer was $2 \times 10^{16}$ Ω.cm.

COMPARATIVE EXAMPLE 1

The polymerization reaction was carried out in the same manner as in Example 1 and the polymer prepared without adding a solvent (ii) to the resulting reaction product was finely divided by means of a blender made by Warning Co., Ltd. to afford a polymer powder with an average particle size of 100 μm. Then, the polymer powder was purified by washing three times with 10 liters of water and then once with 10 liters of acetone. The residual potassium in the resulting polymer was 230 ppm by weight and the volume resistivity thereof was $5 \times 10^{15}$ Ω.cm.

EXAMPLE 2

The polymerization reaction was carried out in the same manner as in Example 1 except that 465 g of 4,4'-dihydroxydiphenyl were employed instead of the hydroquinone. The reaction vessel was cooled to 80° C. and, when the polymer concentration in the reaction mixture reached 6.2% by weight, 5 liters of ethanol as a solvent (ii) were poured into the reaction vessel and the resulting mixture was stirred at 60° C. Thereafter, the resulting polymer powder suspension was purified by washing three times with 10 liters of water and then once with 10 liters of acetone to afford 680 g of a powdery polycyanoaryl ether. The polymer has an average particle size of 40 μm and the reduced viscosity [ηsp/c] of 1.90 dl/g as measured in the same manner as in Example 1. Moreover, the polymer showed residual potassium amount of 160 ppm by weight and a volume resistivity of $1 \times 10^{16}$ Ω.cm.

COMPARATIVE EXAMPLE 2

The polymerization reaction was carried out in the same manner as in Example 2 and the resultant polymer prepared without adding a solvent (ii) to the reaction product was finely divided by means of a blender made by Warning Co., Ltd. to afford a polymer powder with an average particle size of 150 μm. Then, the powdery polymer was purified by washing three times with 10 liters of water and then once with 10 liters of acetone. Residual potassium and sodium in the resultant polymer were 210 ppm by weight and 30 ppm by weight, respectively, and the volume resistivity was $6 \times 10^{15}$ Ω.cm.

EXAMPLE 3

The polymerization reaction was carried out in the same manner as in Example 1 except that 930 g of 4,4'-dihydroxydiphenyl, 860 g of 2,6-dichlorobenzonitrile and 829.2 g of potassium carbonate were used. The reaction vessel was cooled to 120° C. and, when the polymer concentration in the reaction mixture reached to 12.4% by weight, 5 liters of ethanol as a solvent (ii) were poured into the reaction vessel. The resulting mixture was stirred at 60° C. Then, the resultant polymer powder suspension was purified by washing three times with 10 liters of water and then once with 10 liters of acetone to afford 1350 g of a powdery polycyanoaryl ether. The powder had an average particle size of 47 μm and a reduced viscosity [ηsp/c] of 1.90 dl/g as measured in the same manner as in Example 1. Further, the powder showed a residual potassium amount of 170 ppm by weight and a volume resistivity of $1 \times 10^{16}$ Ω.cm.

As apparent from the foregoing description, the present process for preparing a polycyanoaryl ether powder does not require any mechanical grinding step for the resultant polymer as seen in the prior art and can provide a far finer powder than that of such mechanical grinding step so that the subsequent purification step may be sufficiently accomplished. Consequently, the amount of impurities in the polymer can be highly reduced as compared with the prior art polymer, which leads to improvement in electrical properties, e.g., electrical insulation properties of the polymer or supply of a polymer useful as a material for electrical and electronic equipments or mechanical components. Accordingly, its industrial value is very high.

We claim:

1. A process for preparing a polycyanoaryl ether powder which comprises;

reacting at a temperature between 100° and 350° C. a dihalogenobenzonitrile with an alkali metal salt of at least one of hydroquinone or dihydroxydiphenyl or a mixture thereof in the presence of a solvent (i) selected from the group consisting of dimethyl sulfoxide, diethyl sulfoxide, sulfolane, N-methylpyrrolidone, N-methylacetoamide and N-methylformamide to form a reaction mixture containing a dissolved polycyanoaryl ether; and when the construction of said dissolved polycyanoaryl ether in the reaction mixture is in the range of from 2 to 15% by weight, adding to said reaction mixture, a solvent (ii) which is miscible with said solvent (i) but which is not a solvent for said polycyanoaryl ether. said solvent (ii) being added in an amount of from 30 to 200% by volume based on the volume of said solvent (i) and said solvent (ii) being added at a temperature of from 10° to 100° C., whereby said polycyanoaryl ether precipitates from said reaction mixture to which said solvent (ii) has been added, as an extremely fine powder.

2. The process of claim 1, wherein said solvent (ii) is selected from the group consisting of water, methanol, ethanol propanol, butanol, acetone, methyl ethyl ketone, methyl isobutyl ketone, β-butyrolactone and tetrachloroethane.

3. The process of claim 1, wherein both an alkali metal salt of hydroquinone and an alkali metal salt of dihydroxydiphenyl are reacted with said dihalogenobenzonitrile and each of said alkali metal salts is in an amount of 20 mol % or less of the polymerization reactants.

4. The process of claim 1, wherein said dihalogenobenzonitrile and said alkali metal salt are each in approximately equimolar amounts.

5. The process of claim 1, wherein said dihalogenobenzonitrile is selected from the group consisting of 2,4-dichlorobenzonitrile, 2,6-dichlorobenzonitrile, 2,4-difluorobenzonitrile and 2,6-difluorobenzonitrile.

6. The process of claim 1, wherein said alkali metal salt of at least one of hydroquinone or dihydroxydiphenyl or a mixture thereof is the sodium or potassium salt thereof.

7. The process of claim 1, wherein said alkali metal salt of at least one of hydroquinone or dihydroxydiphenyl or a mixture thereof is provided by employing independently at least one of hydroquinone or dihydroxydiphenyl or a mixture thereof and a hydroxide or carbonate of an alkali metal.

8. The process of claim 1, which comprises;

reacting 2,6-dichlorobenzonitrile with a sodium or potassium salt of at least one of hydroquinone or dihydroxydiphenyl or a mixture thereof in the presence of sulfolane or N-methylpyrrolidone; and adding to the reaction mixture, water or methanol in an amount of from 50 to 100% by volume based on the solvent (i) when the concentration of the resulting polymer dissolved in the reaction mixture is from 5 to 12% by weight.

9. The process of claim 2, wherein said dihalogenobenzonitrile and said alkali metal salt are each in approximately equimolar amounts.

10. The process of claim 5, wherein said alkali metal salt of at least one of hydroquinone or dihydroxydiphenyl or a mixture thereof is the sodium or potassium salt thereof.

11. The process of claim 9, wherein said alkali metal salt of at least one of hydroquinone and dihydroxydiphenyl is the sodium or potassium salt thereof.

12. The process of claim 11, wherein said dihalogenobenzonitrile is selected from the group consisting of 2,4-dichlorobenzonitrile, 2,6-dichlorobenzonitrile, 2,4-difluorobenzonitrile and 2,6-difluorobenzonitrile.

13. The process of claim 12, which comprises;

reacting 2,6-dichlorobenzonitrile with a sodium or potassium salt of at least one of hydroquinone or dihydroxydiphenyl or a mixture thereof in the presence of sulfolane or N-methylpyrrolidone; and adding to the reaction mixture, water or methanol in an amount of from 50 to 100% by volume based on the solvent (i) when the concentration of the resulting polymer dissolved in the reaction mixture is from 5 to 12% by weight.

14. The process of claim 13, wherein said reaction temperature is from 150° to 280°; and wherein the solvent (ii) is added at a temperature of from 20° to 70° C.

* * * * *